W. HOOPES.
APPARATUS FOR CALCINING CARBON FOR ELECTRODES.
APPLICATION FILED MAY 20, 1919.
1,366,457.
Patented Jan. 25, 1921.
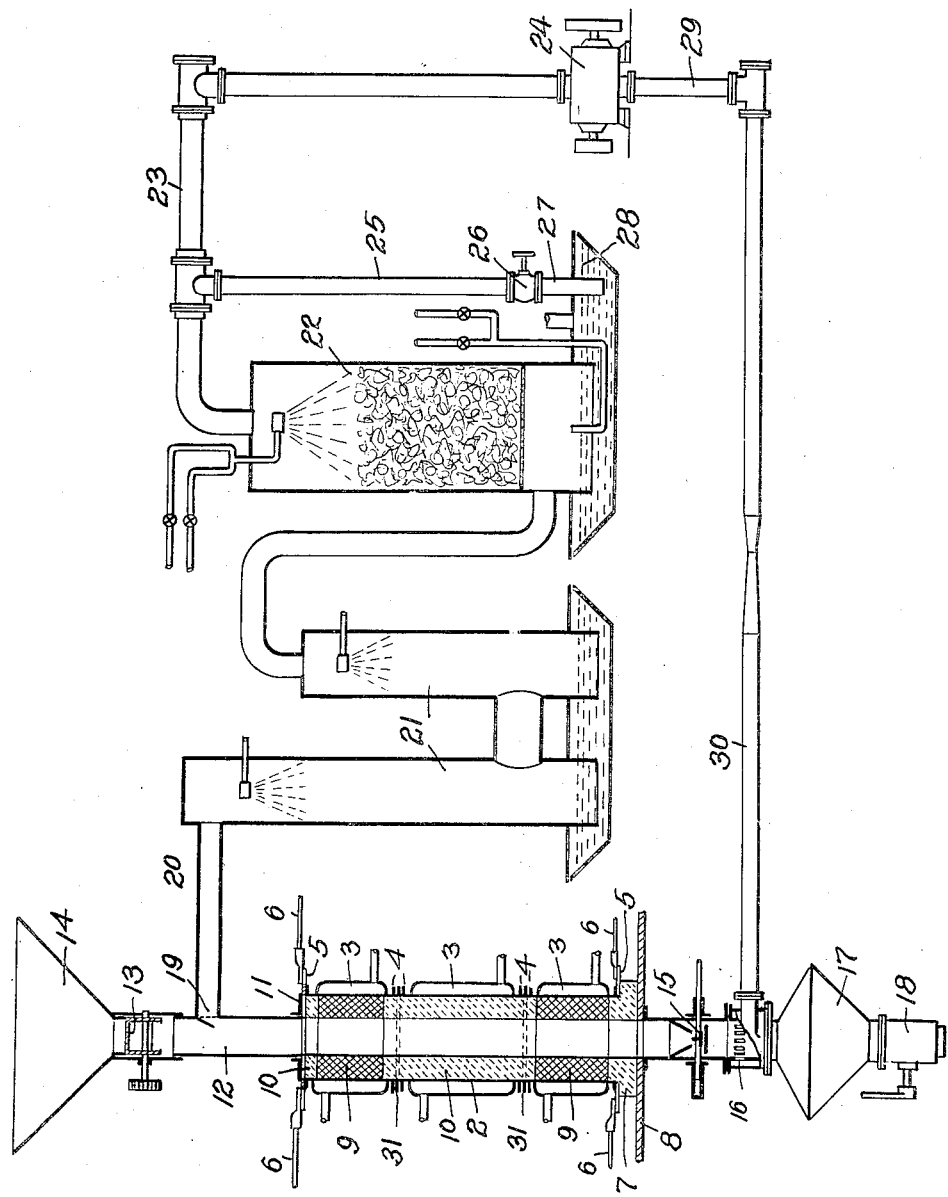
WITNESSES
INVENTOR

UNITED STATES PATENT OFFICE.

WILLIAM HOOPES, OF PITTSBURGH, PENNSYLVANIA, ASSIGNOR TO ALUMINUM COMPANY OF AMERICA, OF PITTSBURGH, PENNSYLVANIA, A CORPORATION OF PENNSYLVANIA.

APPARATUS FOR CALCINING CARBON FOR ELECTRODES.

1,366,457.  Specification of Letters Patent.  Patented Jan. 25, 1921.

Application filed May 20, 1919. Serial No. 298,569.

*To all whom it may concern:*

Be it known that I, WILLIAM HOOPES, a resident of Pittsburgh, in the county of Allegheny and State of Pennsylvania, have invented a new and useful Improvement in Apparatus for Calcining Carbon for Electrodes, of which the following is a specification.

The invention relates to apparatus for calcining coke to produce coke of high grade and as nearly as possible free from volatile matter and which is especially useful for the manufacture of carbon electrodes of high purity and dense structure. The invention relates particularly to apparatus for the continuous calcination of coke by heating the same by an electric current passing through the coke, and the invention will be described in its application to this particular way of heating the coke, although certain features thereof have beneficial effects irrespective of the manner in which the heat is applied to the coke.

The object of the invention is to provide apparatus for the continuous calcining of coke by means of which a more uniform product is produced than has heretofore been obtained in continuous calcining apparatus; which, when the heat is applied electrically, operates more regularly and without variations or fluctuations of current which have been characteristics of prior continuous electrical calcining apparatus; and one in which the consumption of electric or other heat energy is very greatly reduced as compared with prior calcining apparatus.

For the attainment of the foregoing objects the invention consists, generally stated, in an apparatus which utilizes the heat of the finished calcined product, coke, for preheating the green or raw coke being applied to the apparatus, preferably by passing a stream of gas through the coke being treated from the hot or calcined side thereof to the cold or raw side thereof. Such gas absorbs the heat from the calcined coke thus cooling the latter, and prevents overheating of the coke at any one point by transferring heat by convection from the hotter to the cooler portions of the coke body being treated. The heated gas gives off its heat, or a portion thereof, to the raw coke entering the calciner, thus preheating the latter and thereby reducing the amount of heat energy which must be supplied to thoroughly calcine the coke, and, in the case of electrical apparatus, rendering the raw coke electrically conductive to thereby overcome variations, fluctuations or interruptions in the heating current.

The apparatus is particularly adapted for the production of coke for use in the manufacture of high grade carbon electrodes, such for instance, as are used in electric reducing or metallurgical processes. Such electrodes of high quality require a carbon of high purity and one as nearly as possible free from contained volatile matter. The principal source of such pure coke is the well known petroleum coke resulting from the distillation of petroleum. This coke as it comes from the oil stills contains from six to twelve per cent. of volatile matter which must be driven off almost completely (to a small fraction of one per cent.) before the coke is suitable for the manufacture of high grade carbon electrodes. This volatile matter is driven off by heating the coke to temperatures in the neighborhood of 1100° centigrade, and in a manner to prevent contact of the hot coke with the air or other gas which would cause oxidation.

Heretofore efforts have been made to calcine such coke in apparatus in which the coke passes continuously through a furnace or retort and in which the heat is developed within the charge itself by passing an electric current therethrough. Several difficulties have been encountered in attempting to calcine coke, in such apparatus, one being due to the negative temperature coefficient of resistance inherent in the raw coke, as a result of which that portion of the charge through which the electric current first establishes a path is heated thereby, the resistance of this path decreasing as the temperature rises, and this in turn causing more current to follow the original path, thus causing further heating, with the result that the concentration of current and the rise of temperature along this path are cumulative and result in overheating a portion of the charge and insufficiently heating the remainder.

A second practical difficulty arises from the fact that until the volatile matter has been removed or reduced to low proportions the material is a very poor conductor of electricity, and does not become a good conductor until it has been heated. Consequently the supply of comparatively cold raw coke in a continuous operation has a tendency to break the circuit where the comparatively cold coke surrounds or is in contact with the electrode. Consequently it has been difficult to operate such continuous apparatus with coke containing volatile matter in a smooth and regular way and without great variations in the electric current and even frequent interruptions of it.

These difficulties are overcome by the apparatus forming the subject of this invention. In addition the improved apparatus results in a great reduction in the amount of electrical or other heat energy necessary to calcine the coke as compared with prior apparatus, and also results in a more uniform product, this being due to the fact that it utilizes the heat of the finished coke for equalizing the temperature throughout the coke body being treated and prevents overheating of any portion thereof, and also for heating the raw coke entering the apparatus to thereby conserve the heating energy, and also (in the case of electrical apparatus) so that when the raw coke enters the zone of the electric circuit it is already a comparatively good conductor of current.

The invention is adapted to various forms of apparatus, and in the accompanying drawings is shown diagrammatically and in partial section one arrangement of apparatus utilizing an electric current as the heating agent, and which has been found efficient in practical operation.

The furnace retort is of the vertical shaft type in which the raw coke enters at the top and the finished coke is removed or ejected at the bottom, and in which one electrode of the heating circuit is connected at the top of the furnace and the other electrode is connected at the bottom thereof. The furnace shown consists of an exterior steel shell 2, provided with a water cooled jacket 3, to permit water cooling of this shell. The shell is divided into three sections, each being provided at its ends with suitable flanges 4 for conveniently connecting said sections together. Between the flanges of the adjacent sections is inserted a layer of insulating material 31 which may be asbestos, mica, or other suitable material not readily affected by heat, and which serves to electrically separate the sections from each other. The current is led into the top section and out of the bottom section through copper flanges 5 provided with means for the connection of the terminals 6 of the heating circuit. These copper flanges are conductively secured to the flanges of the shell section either by bolting, riveting or in any other well known way. The lower shell section and its conducting flange rests on a layer of brick 7 or other insulating material, which in turn is supported by the base 8 of the furnace.

The interior of the shell along its entire length is lined with material of varying compositions for the purpose of continuing the heat to the center of the shaft, the diameter of the shell and the thickness of the lining being such as to leave a shaft of any desired diameter through which the coke to be calcined passes. The lower and upper sections of the shell are lined, at least for a portion of their length, with a carbon lining 9, preferably baked in place and making electrical contact with the metal shell so that the current can pass through the shell and through this conductive carbon lining into the coke which is in contact therewith. The remainder of the lining is composed of fire brick 10, or other heat resisting insulating material. As shown, the entire central section and a portion of each of the top and bottom sections adjacent to the central section are provided with this insulating lining, which is maintained by the water jacket at a temperature low enough that it does not become electrically conductive, and therefore serves to electrically insulate the coke in the shaft from the central shell section. Consequently the current passes into the top shell section, thence through the carbon lining therein, thence into the column of coke, thence downwardly through the column of coke to the carbon lining of the lower section, thence to the metal shell surrounding the latter and to the other terminal of the electrical circuit.

The top of the furnace is closed by a flange 11, to which is connected a vertical pipe 12, to the top of which is connected feeding means 13 arranged to permit a regular entry of the coke into the furnace without permitting the entry of air thereto or the escape of gases therefrom. Above this is a hopper 14 to which the raw coke is supplied to be fed into the furnace. The bottom 8 of the furnace is provided with a hole at least as large as the size of the shaft through which the calcined coke passes. Below this discharge orifice is mounted a suitable extractor 15, shown as of the reciprocating type, by means of which the discharge of coke through the orifice can be regulated. The casing of this extractor is secured to the base 8 of the furnace and is provided with ports 16 for the entry of gas for a purpose hereinafter described. The extractor serves to drop the coke regularly in a closed hopper 17 the bottom of which is provided with a valve 18, to permit withdrawal of the coke.

In order to preheat the raw coke and utilize the heat of the finished coke for this purpose, gas is introduced through the gas ports 16 and caused to pass upwardly through the column of coke in the furnace, thus absorbing heat from the finished coke and cooling it to such extent that it will not ignite when it comes into contact with the air, and which gas in passing upwardy through the column of raw coke heats the latter and renders it electrically conductive by the time that it enters the upper portion of the electric circuit through the furnace. Gas for this purpose must be chemically inert to the hot coke, and may be derived from any suitable source, but for economy in operation, and since the gas distilled from the coke is of the requisite quality, this distilled off gas is preferably used for this purpose. To this end the pipe 12 is provided with a side outlet 19 through which the gas distilled from the coke in the furnace passes and is thence carried by pipe 20 in succession through a washer 21 and scrubber 22 for the purpose of cleaning said gas and also cooling it. The cleaned or cooled gas is led from the scrubber through pipe 23 which is provided with two branches, one of which leads to the pump 24 while the other branch 25 is for the purpose of removing from the system the excess gas. As shown this branch 25, controlled by valve 26, for regulating the rate of discharge of the gas, is connected to a pipe 27 which extends into a water seal 28, whence the excess gas is withdrawn from the system and in a manner to prevent the entry of air into the system. The discharge side of the pump 24 is connected by pipes 29 and 30 to the ports 16 above mentioned in the extractor casing, preferably entering said casing tangentially as shown, whence the gas circulated by the pump enters the coke column in the furnace.

In the use of the above described apparatus the shaft of the furnace is first filled with calcined coke which is a conductor even when cold. The current is then turned on, and due to the resistance of the coke column the electrical energy of the current is converted into heat thus preliminarily heating the furnace. When the temperature of the furnace has been raised to the proper operating temperature and sufficient time has been allowed for the combination of all of the oxygen in the air contained in the system with the hot coke the pump is started and gas circulation begins. The extractor 15 and coke feeder 13 are then started and raw coke is fed into the shaft to replace the calcined coke being withdrawn. The gas forced into the shaft from the pump rising through the hot coke column, absorbs heat from the latter, and when it passes through the raw coke gives up to the latter a portion of its heat, thus preheating the latter and driving off a portion of the volatile matter contained therein and brings it to such temperature and composition that it becomes electrically conductive. As a consequence, by the time this raw coke gets down into the electrical circuit it is already a good conductor of current and consequently there are no fluctuations or interruptions of the circuit. As the withdrawal and feeding proceed, raw coke which has already been partially calcined comes into contact with the upper electrode 9 and begins to form a portion of the electric circuit, and its calcination is completed by the heating by the electric current as the coke passes downwardly through the furnace. As the withdrawal and feeding continues, the entire original content of the furnace is displaced and is replaced by raw coke, which is continuously calcined on its downward movement through the furnace. The rate of feeding the coke and the input of the electrical energy are so proportioned that the calcination of the coke is complete before it leaves the lower electrode.

The cold gas entering through the ports 16 and passing upwardly through the coke column should be sufficient in quantity to completely cool the outgoing coke to approximately the temperature of the entering gas which is so low that the coke will not ignite when it gets into the air. The gas as it passes upwardly through the furnace attains approximately the maximum temperature in the furnace, and yields its heat, or at least the greater part of it, to the raw coke and leaves the top of the furnace relatively cool. The operation when once started is continuous and may proceed uninterruptedly until such time as the wear on the furnace linings and other parts of the apparatus necessitates repairs.

As above stated any gas which is chemically inert to the hot coke can be employed. Either hydrogen or nitrogen would be a suitable gas, but for economy, and since the gaseous portion of the volatile matter resulting from the calcining of the coke, is a suitable gas it is preferably used. The gas passing through the furnace should be of sufficient quantity to overcome any tendency to concentration of current and heat in any particular section of the charge by absorbing the heat from any overheated portion and transferring it to some cooler portion of the charge. The volume of gas which must be discharged from the system is, of course, the volume necessarily generated during the calcining operation, and the volume which is forced into the bottom of the furnace and circulated through the system bears no relation to the amount of gas generated and can be made any desired quantity as may be found to be most suitable. The discharged gas can be used for fuel or other purposes, and since (after the system is once started) it is the total volume necessarily generated during the calcining operation, the operation is very economical in this particular.

The apparatus is also very economical in the consumption of electric current or other heating energy necessary to effect the calcination of the coke, due to the fact that the heat is largely extracted from the finished coke and utilized in heating the raw coke. Theoretically, after the system is once at the proper operating temperature, no further heat is required to be added thereto, but in practice the usual losses of radiation, convection and conduction must be supplied, and these are supplied, in the apparatus illustrated, by the energy of the electrical current; but the amount of such energy which must be added for the calcination of a unit of coke is much less than that required where the recuperation described is not made use of.

The proportion of gas, coke and heating energy can be made such as to permit both the gas and the coke to be discharged at comparatively low temperatures, which is the condition of maximum efficiency. At this low temperature the gas contains the volatile products of coke in solid, or gaseous or liquid form, depending upon the physical nature of the varieties of compounds driven off. The washer and scrubber remove from the gas as much of the entrained matter as can be removed by apparatus of this kind, and also cool the gas so that the portion of that gas which is returned to the furnace is substantially cold and will effectively cool the finished coke to such temperature that it will not ignite when it comes in contact with the air. The gas distilled from the coke is composed principally of hydrogen and hydro-carbons. That portion of the hydro-carbon contained in the gas which is returned to the furnace is largely decomposed in its passage through the hot zone, the carbon thereof being deposited on the coke, thus resulting in a slight gain in the quantity of pure carbon as compared with prior apparatus where such decomposition of the hydro-carbons of the distilled gas does not take place.

As a result of all these factors the apparatus is very economical to operate as compared with prior apparatus. Furthermore, it produces a more uniform product, all portions of the coke column being, through the medium of the gas passing through it, maintained at substantially the same temperature, and in the case said column is heated by itself being a part of an electric circuit, this gas maintains the column in a condition of conductivity so that the apparatus operates without variations or fluctuations in or interruptions of the electric circuit.

While the form of furnace illustrated is the preferable one, the invention is not limited to such furnace, but many other forms of furnace can obviously be used for effecting all, or at least a portion of the beneficial results of the invention. For instance, with electrical furnaces it is possible to use a shell lined entirely with fire brick and in which the electrodes are placed at the center of the mass of coke, at the two ends of the coke column, and in which one or both of said electrodes are completely insulated from the lining. This is a form of furnace heretofore used in the art, and obviously the passing of a current of gas through said furnace will effect all of the economies heretofore described. The construction illustrated, however, is preferable because the electrodes are external to the column of coke, and therefore this construction has the advantage that there is nothing to obstruct the free passage of coke from the top to the bottom of the furnace.

The invention is also applicable to furnaces heated externally, as the vertical retorts lined with fire brick and externally heated by burning a mixture of gas and air, which have heretofore been used. Obviously with such retorts, if a current of gas is passed upwardly through the column of coke therein, it will result in distributing the heat throughout the entire cross section of the column, thus preventing overheating at any point and resulting in a more uniform product, and also the heat of the calcined coke will be conserved and used to heat the raw coke entering the retort, thus reducing the amount of heat which must be applied externally to the retort to calcine a given quantity of coke; or with the same amount of heat applied externally, a larger amount of coke can be calcined, thus permitting a more rapid passage of coke through the retort and increasing its capacity.

The method of calcining the coke herein disclosed is claimed in an application of even date herewith, Serial No. 298,570.

I claim:

1. Apparatus for calcining coke comprising an inclosed chamber arranged to have raw coke supplied to its top and the calcined coke withdrawn from its bottom, means for heating the column of coke in said chamber, a gas inlet to the bottom of said chamber, a gas outlet from the top of said chamber, gas cleaning and cooling apparatus connected to the gas outlet and to the gas inlet respectively, and means in the latter connection for forcing a portion of the cleaned and cooled gas into said coke chamber.

2. Apparatus for calcining coke, comprising an inclosed chamber of substantially uniform cross-sectional area from top to bottom, coke feeding apparatus connected to the top of said chamber, coke withdrawing apparatus connected to the bottom of said chamber, a gas inlet to the bottom of said chamber, a gas outlet from the top of said chamber, and means for circulating gas from said gas inlet to said gas outlet.

3. Apparatus for calcining coke, comprising an inclosed chamber, coke feeding apparatus connected to the top of said chamber, coke withdrawing apparatus connected to the bottom of said chamber, a gas inlet to the bottom of said chamber, a gas outlet from the top of said chamber, gas cleaning and cooling apparatus connected to the gas outlet and gas inlet respectively, and means in the latter connection for returning a portion of the cleaned gas to said coke chamber.

4. An apparatus for calcining coke, comprising an inclosing chamber arranged to have the raw coke supplied to its top and the calcined coke withdrawn from its bottom, electrical terminals arranged to pass electric current through the coke in the central portion of said chamber, a gas inlet to the bottom of said chamber, a gas outlet from the top of said chamber, gas cleaning and cooling apparatus connected to the gas outlet and to the gas inlet, and means for returning a portion of the cleaned and cooled gas through said gas inlet.

5. An apparatus for calcining coke, comprising an inclosing chamber, coke feeding apparatus connected to the top of said chamber, coke withdrawing apparatus connected to the bottom of said chamber, a gas inlet to the bottom of said chamber, a gas outlet from the top of said chamber, gas cleaning and cooling apparatus connected to the gas outlet and inlet, means in the latter connection for returning a portion of the clean gas to said coke chamber, and means in the latter connection for removing a portion of the gas therefrom.

In testimony whereof, I have hereunto set my hand.

WILLIAM HOOPES.

Witnesses:
  EMMA UHLINGER,
  G. A. MURPHY.